US012797656B2

(12) United States Patent

Zhao et al.

(10) Patent No.: US 12,797,656 B2

(45) Date of Patent: Nov. 17, 2026

(54) INTELLIGENT AND EFFICIENT FIRE EXTINGUISHING DEVICE AND METHOD BASED ON INTERNAL AND EXTERNAL FLOW FIELD INFORMATION OF STORAGE TANK FIRE

(71) Applicant: China University of Mining and Technology (Beijing), Beijing (CN)

(72) Inventors: Jinlong Zhao, Beijing (CN); Zhenqi Hu, Beijing (CN); Xinjiang Li, Beijing (CN); Xin Kong, Beijing (CN); Jianping Zhang, Beijing (CN); Liqun Feng, Beijing (CN)

(73) Assignee: China University of Mining and Technology (Beijing), Beijing (CN)

( * ) Notice: Subject to any disclaimer, the term of this patent is extended or adjusted under 35 U.S.C. 154(b) by 189 days.

(21) Appl. No.: 18/824,967

(22) Filed: Sep. 5, 2024

(65) Prior Publication Data

US 2025/0073511 A1 Mar. 6, 2025

(30) Foreign Application Priority Data

Sep. 6, 2023 (CN) ......................... 202311143158.X

(51) Int. Cl.

*A62C 3/06* (2006.01)
*A62C 5/02* (2006.01)
(Continued)

(52) U.S. Cl.

CPC .............. *A62C 3/065* (2013.01); *A62C 5/022* (2013.01); *A62C 27/00* (2013.01); *A62C 31/12* (2013.01); *A62C 37/00* (2013.01); *A62C 99/0036* (2013.01)

(58) Field of Classification Search

CPC .. A62C 3/06; A62C 3/065; A62C 5/02; A62C 5/022; A62C 5/027; A62C 27/00;
(Continued)

(56) References Cited

U.S. PATENT DOCUMENTS 2,251,175 A * 7/1941 Tappe .................... A62C 31/24
169/70
2,736,387 A * 2/1956 Boerner ............... A62C 99/009
169/67
(Continued)

*Primary Examiner* — Steven J Ganey

(74) *Attorney, Agent, or Firm* — Abd Almonem Doolaanea

(57) ABSTRACT

The intelligent and efficient fire extinguishing device mainly comprises an intelligent sensing system, a power-driven system, an intelligent control system, a foam system, a fixation system, a support lifting system and a protection system. The intelligent sensing system is used to measure the ambient wind direction and the internal flow field of the tank to determine the fire extinguishing location. The intelligent control system controls the power-driven system to reach the designated location based on the intelligent sensing system. The foam system is used to spray foam. The fixation system is used to fix the device. The support lifting system is used to lift or rotate the cooling nozzle and fire-fighting water cannon. The protection system is used to protect the device. The movement, positioning and extinguishing of the fire extinguishing device are unitedly controlled by the intelligent control system. The invention can achieve intelligent fire extinguishment in storage tanks.

9 Claims, 3 Drawing Sheets

(51) Int. Cl.

| | |
|---|---|
| ***A62C 27/00*** | (2006.01) |
| ***A62C 31/12*** | (2006.01) |
| ***A62C 37/00*** | (2006.01) |
| ***A62C 99/00*** | (2010.01) |

(58) Field of Classification Search

CPC ......... A62C 31/03; A62C 31/12; A62C 31/28; A62C 37/00; A62C 99/0036; A01M 7/006; A01M 7/0075; A01M 7/0082; G01C 21/20; G05D 1/001; G05D 1/0274; B05B 9/007

USPC ............... 169/14, 24, 47, 52, 66, 67, 68, 70; 239/159, 164, 165, 172, 176; 701/2, 701/33.4, 50; 220/88.1

See application file for complete search history.

(56) References Cited

U.S. PATENT DOCUMENTS

| | | | | |
|---|---|---|---|---|
| 3,876,010 | A * | 4/1975 | Blomquist | A62C 3/06 169/68 |
| 4,781,252 | A * | 11/1988 | Wilburn | A62C 3/06 169/68 |
| 8,261,843 | B2 * | 9/2012 | Daspit | B05B 15/62 169/66 |
| 2004/0140106 | A1 * | 7/2004 | De Anda-Uribe | A62C 31/24 169/66 |

* cited by examiner

INTELLIGENT AND EFFICIENT FIRE EXTINGUISHING DEVICE AND METHOD BASED ON INTERNAL AND EXTERNAL FLOW FIELD INFORMATION OF STORAGE TANK FIRE

CROSS REFERENCE TO RELATED APPLICATION

This application claims the priority of Chinese Patent Application No. 202311143158.X, entitled "Intelligent and Efficient Fire Extinguishing Device and Method based on the Internal and External Flow Field Information of Storage Tank Fire", filed on Sep. 6, 2023, the disclosure of which is incorporated herein by reference in its entirety.

BACKGROUND OF THE INVENTION

1. Field of the Invention

The present invention relates to the prevention, protection and mitigation of a storage tank on fire, in particular to an intelligent and efficient fire extinguishing device and method based on the internal and external flow field information of the storage tank on fire.

2. Description of Related Art

As the economy continues to develop, the demand for petroleum energy is steadily increasing. To meet the growing need for energy storage in China, a significant number of petroleum storage tanks has been constructed, with both their individual capacities and overall numbers on the rise. However, in recent years, there has been a troubling increase in fire and explosion accidents involving these storage tanks, posing a serious threat to the safety of energy storage and transportation.

Currently, there are two main methods for extinguishing fires in storage tanks: fixed extinguishing devices (installed on the tops of the tanks) and mobile extinguishing devices (external firefighting equipment). Fixed extinguishing devices operate by injecting foam directly into the tank through fixtures installed around the tank's top, enabling rapid extinguishment when a fire occurs. However, due to the potential for explosions in the early stages, these fixed devices are highly susceptible to damage from fire plumes. Mobile extinguishing devices involve deploying firefighting vehicles and high-spray trucks from external fire brigades and onsite firefighting departments to spray foam from a distance. This method is often hindered by delays caused by personnel coordination, equipment setup, and site layout, which can result in missing the optimal window for extinguishment. Additionally, it poses significant risks to the safety of the firefighters. Moreover, the foam sprayed from high-spray trucks is easily dispersed by the plumes inside the tank, preventing it from effectively entering the tank and resulting in low extinguishing efficiency.

In recent years, studies have shown that the downwind side of the storage tank on fire is more affected by radiation of flames, making firefighting equipment located on the downwind side more susceptible to damage. Additionally, it has been observed that during a storage tank on fire, there is a phenomenon known as "down-reaching flame", where flames intermittently appear inside the tank. This phenomenon causes a significant amount of oxygen is consumed inside the tank, creating local pressure differentials and forming "air intake channels" and "fire plume channels". The "air intake channels" (negative pressure) entrain external air into the tank to sustain the fire, while combustion products are expelled through the "plume channels" (positive pressure). This dynamic directly affects the efficiency of mobile extinguishing methods, such as high-spray trucks. When the spray position of a high-spray truck is near "air intake channels," the foam is drawn into the tank along with the incoming air, leading to rapid extinguishment. Conversely, if the spray position is near "plume channels," the foam is dispersed by the plume and struggles to enter the tank, resulting in low extinguishing efficiency. To address this challenge, an intelligent and efficient firefighting device has been developed, which leverages the information about the internal and external flow fields of the storage tank on fire. By utilizing flow field data, the device can intelligently determine the optimal spray position for extinguishing the fire. It identifies the "air intake channels" based on the internal flow field conditions of the storage tank on fire, ensuring efficient extinguishment.

SUMMARY OF THE INVENTION

This present invention is focused on the development and application of an intelligent and efficient fire extinguishing device based on the internal and external flow field information of the storage tank on fire, which has not been done in the past. When a storage tank fire occurs, the intelligent and efficient fire extinguishing device can determine and move to the optimal position based on the flow field conditions of the fire. It accurately sprays foam into the tank, taking into account the internal flow field, thus overcoming the technical challenges of imprecise foam application and foam being dispersed by fire plumes. This significantly improves the efficiency of extinguishing the storage tank on fire and effectively reduces foam usage.

This present invention is also focused on proposing an intelligent and efficient fire extinguishing method based on the internal and external flow field information of the storage tank on fire.

The present invention is an intelligent and efficient fire extinguishing device based on the internal and external flow field information of the storage tank on fire, comprising an intelligent sensing system, a power-driven system, an intelligent control system, a foam system, a fixation system, a support lifting system and a protection system. The intelligent sensing system is used to obtain the flow field information inside and outside the burning storage tank and then determines the upwind side of the burning storage tank and the position of the "air intake channels", which enables the planning of the movement route for the intelligent and efficient fire extinguishing device and the determination of the spray angles for the foam nozzles. The power-driven system is used to provide power and enable the intelligent and efficient fire extinguishing device to movement. The intelligent control system is designed to receive and interpret the operational status of the storage tank and to intelligently manage the operation of all other systems within the intelligent and efficient fire extinguishing device. The foam system is used to spray foam into the burning storage tank. The fixation system is used to secure the intelligent and efficient fire extinguishing device around the burning storage tank. The support lifting system is used to control the lifting and lowering and/or rotation of the cooling nozzles and fire-fighting water cannon. The protection system is used to cool the intelligent and efficient fire extinguishing device, ensuring its proper operation in high-temperature environments.

In an embodiment, the intelligent control system can monitor and identify the operational status of the storage tank. By determining the number and locations of the burning tanks, it automatically plans the movement route for the intelligent and efficient fire extinguishing device and controls its movement accordingly.

In accordance with an intelligent and efficient fire extinguishing device based on the internal and external flow field information of the storage tank on fire, wherein the intelligent sensing system comprises a wind direction and flow field measuring device, a pressure and flow field measuring device. The wind direction and flow field measuring device is installed on an automatic telescopic pipeline and is used to collect external flow field and wind direction information of the burning storage tank, thereby determining the upwind side of the tank. The pressure and flow field measuring device is mounted on the foam nozzle and is used to measure the internal flow field distribution within the storage tank on fire, thereby identifying the location of the "air intake channels."

In an embodiment, the intelligent and efficient fire extinguishing device can use the wind and flow field information near the burning storage tank obtained from the wind direction and flow field measuring device to move to the upwind side of the tank. This effectively reduces the impact of fire plumes on the device, minimizing potential damage.

In an embodiment, by sensing changes in pressure and flow field signals inside the tank using the pressure and flow field measuring device, the internal pressure and flow field distributions are obtained. Based on these internal flow field distributions, the automatic telescopic pipeline and steering gear are adjusted to change the position and direction of the foam nozzle. This allows the foam to be injected into the tank through the internal flow field, reducing the likelihood of the foam being dispersed by the fire plumes.

In accordance with an intelligent and efficient fire extinguishing device based on the internal and external flow field information of the storage tank on fire, wherein the power-driven system comprises a power chassis and a power supply: the power chassis is used to move and/or swerve the intelligent and efficient fire extinguishing device; the power supply is used to provide power to the intelligent and efficient fire extinguishing device.

In accordance with an intelligent and efficient fire extinguishing device based on the internal and external flow field information of the storage tank on fire, wherein the intelligent control system is located on the power chassis and is used to monitor and identify the operating status of the storage tank. The intelligent control system is also used to obtain and identify information from the intelligent sensing system, thereby planning the route of the power chassis and the direction of the fire-fighting water cannon; the intelligent control system is also used to control the movement and/or steering of the power chassis, thereby driving the movement of the intelligent and efficient fire extinguishing device; the intelligent control system is also used to control the foam system to supply foam to the fire-fighting water cannon; the intelligent control system is also used to control the extension, steering, and foam spraying of the fire-fighting water cannon; the intelligent control system is also used to control the extension of the telescopic rod in the fixation system and to control the electromagnet adsorption device to adhere to the sidewall of the storage tank; the intelligent control system is also used to control the lifting and/or rotation of the support lifting system; and the intelligent control system is also used to control the switch of the water pump in the protection system.

In accordance with an intelligent and efficient fire extinguishing device based on the internal and external flow field information of the storage tank on fire, wherein the foam system comprises a foam supply tank, a foam supply line and a fire-fighting water cannon. The foam supply tank is used to store and supply foam. The foam supply tank comprises a foam supply flange port. The foam supply flange port is used to input foam into the foam supply tank from exterior. The foam supply line is connected at one end to the foam supply tank and at the other end to the fire-fighting water cannon. The fire-fighting water cannon is used to spray foam into the storage tank on fire. The fire-fighting water cannon comprises an automatic telescopic pipeline, a steering gear and a foam nozzle. The automatic telescopic pipeline is arranged on the lifting platform and is used to extend or retract the steering gear, the foam nozzle and the pressure and flow field measuring device. The steering gear is installed at the top of the automatic telescopic pipeline and is connected to the foam nozzle. The steering device is used to adjust the spraying direction of the foam nozzle and the monitoring angle of the pressure and flow field measuring device. The foam nozzle is used to disperse and spray foam.

In an embodiment, the automatic telescopic pipeline is an electrically controlled telescopic pipeline that can be intelligently controlled by the intelligent control system.

In an embodiment, the foam supply line can be a telescopic hose that can move freely within the lifting range of the support lifting system. The foam supply pipeline does not affect the lifting of the support lifting system.

In an embodiment, the foam nozzle is detachable and can be removed and replaced on-site if it becomes damaged.

In an embodiment, the automatic telescopic pipeline can extend the pressure and flow field measuring device into the storage tank on fire, improving the ability to identify the flow field inside the tank.

In accordance with an intelligent and efficient fire extinguishing device based on the internal and external flow field information of the storage tank on fire, wherein the fixation system comprises a telescopic rod and an electromagnet adsorption device. The telescopic rod is located on one side of the power chassis and is used to adjust the position of the electromagnet adsorption device. The electromagnet adsorption device is situated at the top of the telescopic rod and is used to adhere to the sidewall of the storage tank, thereby fixing the power chassis around the tank.

In accordance with an intelligent and efficient fire extinguishing device based on the internal and external flow field information of the storage tank on fire, wherein the support lifting system comprises a lifting platform, a rotating device and an automatic lifting strut. The lifting platform is fixed at the top of the automatic lifting strut and is used to place and secure the fire-fighting water cannon, the intelligent sensing system, and the cooling nozzle. The rotating device is used to drive the rotation of the lifting platform, thereby adjusting the spraying direction of the fire-fighting water cannon. The automatic lifting strut is used to drive the lifting and lowering of the lifting platform, thereby adjusting the height of the fire-fighting water cannon, the cooling nozzle, and the intelligent sensing system.

In accordance with an intelligent and efficient fire extinguishing device based on the internal and external flow field information of the storage tank on fire, wherein the protection system comprises a water tank, a water pump, a telescopic water supply pipeline, a cooling nozzle and a water circulation device. The water tank is placed on the power chassis and is used to store and supply water. The water tank comprises a water supply flange port and a water supply line. The water supply flange port is used to connect external water supply equipment to the water tank. The water supply line is connected at both ends to the water tank and the telescopic water supply pipeline. The water pump is connected at both ends to the telescopic water supply pipeline and the water circulation device, and is used to draw water from the water circulation device and supply it to the cooling nozzle. The telescopic water supply pipeline is used to deliver water to the cooling nozzle. The cooling nozzle is fixed on the lifting platform and is used to spray cooling water mist. The water circulation device is used to collect the water sprayed by the cooling nozzle.

In an embodiment, the telescopic water supply pipeline can be a telescopic hose that moves freely within the lifting range of the support lifting system. The telescopic water supply pipeline should not affect the lifting of the support lifting system.

In an embodiment, the water circulation device can be a metal water reservoir of various shapes, fixed to the power chassis, which is less likely to be damaged or deformed by flame radiation. The size of the water circulation device should cover the spraying radius of the cooling nozzle to collect most of the water sprayed by the cooling nozzle, thereby improving water resource utilization and reducing the likelihood of the cooling nozzle failing due to insufficient water.

In an embodiment, the water mist sprayed by the cooling nozzle can easily cover the intelligent and efficient fire extinguishing device, thereby isolating the fire plume and reducing the surface temperature of the intelligent and efficient fire extinguishing device.

In accordance with an intelligent and efficient fire extinguishing method based on the internal and external flow field information of the storage tank on fire, wherein the operation process comprises:

When a storage tank occurs, the intelligent control system is used to monitor and identify the operational status of the tank, confirm the location of the burning tank, and control the intelligent and efficient fire extinguishing device to move towards the burning tank.

Once the intelligent and efficient fire extinguishing device is near the burning tank, it uses the wind direction and flow field measuring device to determine the upwind position of the burning tank.

The intelligent control system then controls the intelligent and efficient fire extinguishing device to move to the upwind side and fixes itself to the tank's sidewall by using the fixation system.

The intelligent control system controls the protection system to perform cooling spraying operations.

The intelligent control system controls the support lifting system to lift the fire-fighting water cannon to the top of the tank.

The intelligent control system controls the automatic telescopic pipeline to extend the pressure and flow field measuring device and foam nozzle into the tank.

The intelligent control system controls the rotation of the steering gear to adjust the monitoring angle of the pressure and flow field measuring device.

The intelligent control system controls the fire-fighting water cannon to spray foam.

BRIEF DESCRIPTION OF THE DRAWINGS

In order to more clearly illustrate technical solutions of embodiments of the invention or the prior art, drawings will be used in the description of embodiments or the prior art will be given a brief description below. Apparently, the drawings in the following description only are some of embodiments of the invention, the ordinary skill in the art can obtain other drawings according to these illustrated drawings without creative effort.

Figure 1:
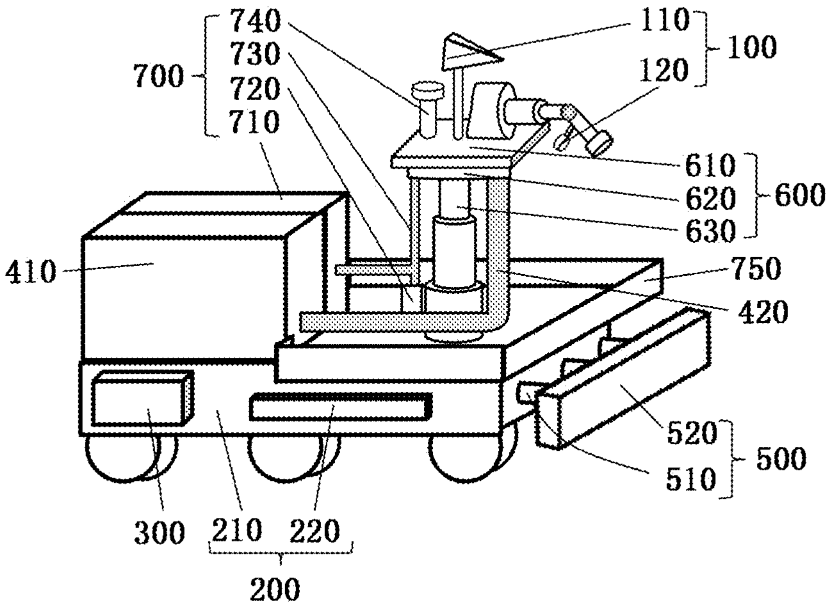
FIG. 1 is an overall structure diagram of the intelligent and efficient fire extinguishing device based on the internal and external flow field information of the storage tank on fire of the present invention.

Wherein: 100—intelligent sensing system, 110—wind direction and flow field measuring device, 120—pressure and flow field measuring device, 200—power-driven system, 210—power chassis, 220—power supply, 300—intelligent control system, 400—foam system, 410—foam supply tank, 411—foam supply flange port, 420—foam supply line, 430—fire-fighting water cannon, 431—automatic telescopic pipeline, 432—steering gear, 433—foam nozzle, 500—fixation system, 510—telescopic rod, 520—electromagnet adsorption device, 600—support lifting system, 610—lifting platform, 620—rotating device, 630—automatic lifting strut, 700—protection system, 710—water tank, 711—water supply flange port, 712—water supply line, 720—water pump, 730—telescopic water supply pipeline, 740—cooling nozzle, 750—water circulation device.

DETAILED DESCRIPTION OF THE PREFERRED EMBODIMENTS

The following clearly and completely describes the technical solutions in the embodiments of the present invention with reference to accompanying drawings. It is worthwhile to note that the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention are described in detail below, with examples illustrated in the accompanying drawings, wherein the same or similar reference numerals refer to the same or similar elements or elements having the same or similar functions throughout. In the description of the present invention, it should be understood that the orientation or positional relationship indicated by the terms such as "upper", "lower", "front", "rear", "left", "right", "inner", "outer", "vertical" and "circumferential" is based on the orientation or positional relationship shown in the accompanying drawings, and is only for the convenience of describing the present invention and simplifying the description, rather than indicating or implying that the indicated device or element must have a specific orientation or constructed and operated in a specific orientation, and therefore should not be construed as limiting the invention.

To highlight the features and advantages of the present invention, it will be described in further detail below with reference to the accompanying drawings and specific embodiments.

FIG. 1 shows an intelligent and efficient fire extinguishing device and method based on the internal and external flow field information of the storage tank on fire. As shown in FIG. 1, the embodiment provides the intelligent and efficient fire extinguishing device, comprising an intelligent sensing system 100, power-driven system 200, intelligent control system 300, foam system 400, fixation system 500, support lifting system 600, protection system 700.

Figure 2:
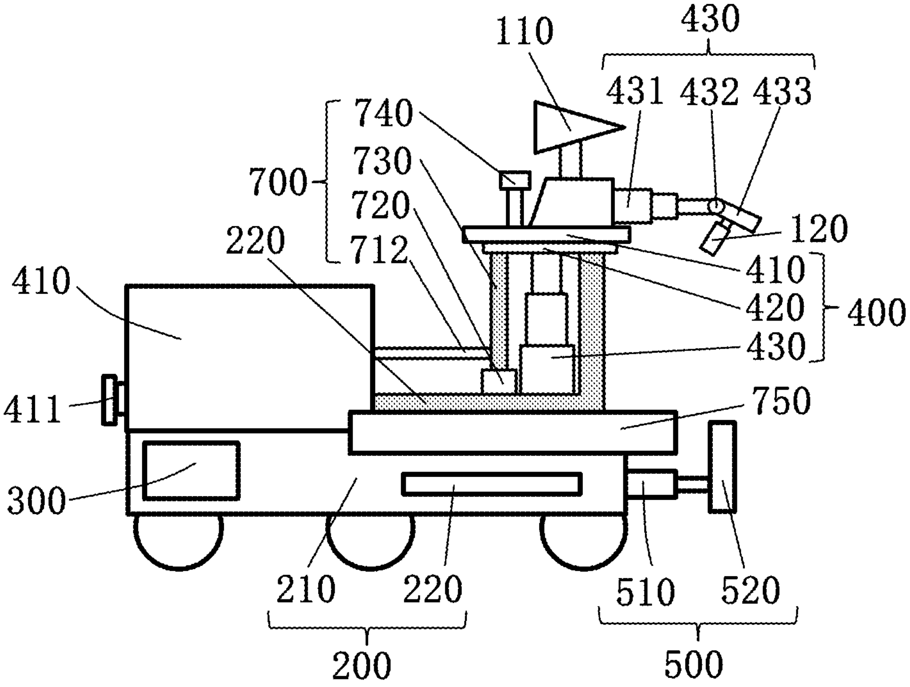
FIG. 2 is the main view of an intelligent and efficient fire extinguishing device and method based on the internal and external flow field information of the storage tank on fire of the present invention.

In the embodiment, as shown in FIG. 1 and FIG. 2, the intelligent sensing system-100 comprises a wind direction and flow field measuring device 110, pressure and flow field measuring device 120. The wind direction and flow field measuring device 110 is arranged on the automatic telescopic pipeline 431 and is used to obtain flow field information of the tank fire. The pressure and flow field measuring device 120 is arranged on the foam nozzle 433 and is used to detect the flow field distribution inside the burning storage tank.

Optionally, the wind direction and flow field measuring device 110 is a wind vane that can obtain information about wind direction changes near the burning storage tank to determine the upwind position of the tank fire.

In some specific embodiments, as shown in FIG. 1, the wind direction and flow field measuring device 110 obtains wind direction information near the burning storage tank to confirm the upwind position of the tank.

Optionally, the pressure and flow field measuring device 120 is a pitot tube used to measure local pressure values inside the storage tank. By analyzing the pressure distribution, it can confirm the position of the "air intake channels" inside the burning storage tank.

In some specific embodiments, the state information measured by the pressure and flow field measuring device 120 indicates a negative pressure, suggesting that the position of the foam nozzle 433 is the "air intake channels" of the storage tank on fire. This means that firefighting operations can be conducted at this position and the foam sprayed here can be effectively entrained into the tank. Conversely, if the pressure and flow field measuring device 120 indicates a positive pressure, it means that this position is the "fire plume channels", where the sprayed foam will be blown away or out of the tank. In this case, the intelligent and efficient fire extinguishing device must be moved and a new firefighting spray position should be selected.

As shown in FIG. 1, the power-driven system 200 comprises a power chassis 210 and a power supply 220. The power chassis 210 is used to drive the intelligent and efficient fire extinguishing device to movement and/or steer. The power supply 220 provides power for the intelligent and efficient fire extinguishing device.

Optionally, the power chassis 210 is a motor vehicle with the advantages of fast movement and large load capacity, ensuring the stable movement and/or steering of the intelligent and efficient fire extinguishing device 1000.

As shown in FIG. 1, the intelligent control system 300 is located on the power chassis 210 and is used to monitor and identify the operational status of the storage tank. The intelligent control system 300 is also used to obtain and identify the information from the intelligent sensing system 100 to plan the route of the power chassis 210 and the direction of the fire-fighting water cannon 430. The intelligent control system 300 is also used to control the movement and/or steering of the power chassis 210, thereby driving the movement of the intelligent and efficient fire extinguishing device. The intelligent control system 300 also controls the foam supply tank 410 in the foam system 400 to provide foam to the fire-fighting water cannon 430. The intelligent control system 300 also controls the extension, steering, and foam spraying of the fire-fighting water cannon 430.

Figure 3:
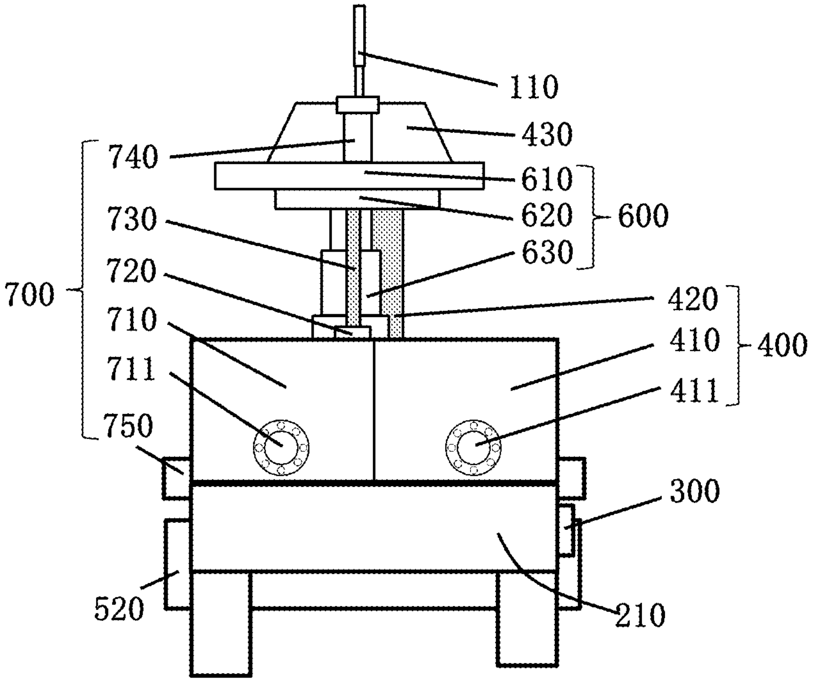
FIG. 3 is the left view of an intelligent and efficient fire extinguishing device and method based on the internal and external flow field information of the storage tank on fire of the present invention.

As shown in FIG. 1 and FIG. 3, the foam system 400 is mounted on the power chassis 210 and comprises a foam supply tank 410, a foam supply flange port 411, a foam supply line 420, a fire-fighting water cannon 430, an automatic telescopic pipeline 431, a steering gear 432 and a foam nozzle 433. The foam supply tank 410 is used to store and supply foam. The foam supply tank comprises a foam supply flange port 411, which is used to connect to an external foam liquid base station to input foam into the foam supply tank 410. The foam liquid supply line 420 is connected at both ends to the foam supply tank 410 and the fire-fighting water cannon 430. The fire-fighting water cannon 430 is used to spray foam into the burning storage tank. The fire-fighting water cannon 430 comprises an automatic telescopic pipeline 431, a steering gear 432 and a foam nozzle 433. The automatic telescopic pipeline 431 is arranged on the lifting platform 610 and is used to control the extension or retraction of the steering gear 432, foam nozzle 433, and pressure and flow field measuring device 120. The steering gear 432 is located at the top of the automatic telescopic pipeline 431 and is connected to the foam nozzle 433, which is used to adjust the spraying direction of the foam nozzle 433 and the monitoring angle of the pressure and flow field measuring device 120. The foam nozzle 433 is used to disperse and spray foam.

Optionally, the foam in the foam supply tank 410 can be a high-concentration fluor protein foam fire extinguishing agent.

Preferably, in actual fire rescue operations, if the foam inside the foam system 400 is insufficient, additional foam can be obtained by connecting an external foam liquid base station to the foam supply flange port 411.

As shown in FIG. 1 and FIG. 2, the fixation system 500 comprises a telescopic rod 510 and an electromagnet adsorption device 520. The telescopic rod 510 is located on one side of the power chassis 210 and is used to adjust the position of the electromagnet adsorption device 520. The electromagnet adsorption device 520 is positioned at the top of the telescopic rod 510 and is used to adhere to the sidewall of the storage tank, thereby fixing the power chassis 210 around the tank.

Optionally, the electromagnet adsorption device 520 can be a DC electromagnet device.

Optionally, the telescopic rod 510 can be an electric push rod, disregarding the transmission mechanism, and used to extend or retract the electromagnet adsorption device 520.

As shown in FIG. 1 and FIG. 2, the support lifting system 600 comprises a lifting platform 610, a rotating device 620 and an automatic lifting strut 630. The lifting platform 610 is fixed on the rotating device 620 and is used to place and secure the cooling nozzle 740, fire-fighting water cannon 430 and intelligent sensing system 100. The rotating device 620 is installed at the top of the automatic lifting strut 630 and is used to drive the rotation of the lifting platform 610, thereby adjusting the spraying direction of the fire-fighting water cannon 430. The automatic lifting strut 630 is used to drive the lifting and lowering of the lifting platform 610, which in turn drives the lifting and lowering of the fire-fighting water cannon 430, cooling nozzle 740 and intelligent sensing system 100.

Optionally, the automatic lifting strut 630 can be an electric push rod and capable of vertical extension and retraction to drive the lifting platform 610 up and down.

Preferably, the number of automatic lifting strut 630 can be at least one to ensure stable lifting of the lifting platform 610.

As shown in FIG. 1 and FIG. 2, the protection system 700 comprises a water tank 710, a water supply flange port 711, a water supply line 712, a water pump 720, a telescopic water supply pipeline 730, a cooling nozzle 740 and a water circulation device 750. The water tank 710 is used to store and supply water. The water supply flange port 711 connects to external water supply equipment to provide water to the water tank 710. The water supply line 712 connects at both ends to the water tank 710 and the telescopic water supply pipeline 730. The water pump 720 connects at both ends to the cooling nozzle 740 and the water circulation device 750, which is used to pump water from the water circulation device 750 to the cooling nozzle 740. The telescopic water supply pipeline 730 connects to the water pump 720, cooling nozzle 740, and water supply line 712. The cooling nozzle 740 is placed on the lifting platform 510 and is used to spray cooling water mist. The water circulation device 750 is used to collect the water sprayed by the cooling nozzle 740.

Optionally, the water circulation device 750 can be a rectangular metal water reservoir, with its size sufficient to completely cover the spray radius of the cooling nozzle 740.

Preferably, the cooling water mist sprayed by the cooling nozzle 740 can easily cover the support lifting system 600 and the fire-fighting water cannon 430, thereby isolating fire plumes and achieving a protective effect.

Preferably, during actual fire rescue operations, if the water in the water tank 710 is insufficient, an external water source can be connected through the water supply flange port 711 to ensure the protection system 700 consistently sprays cooling water mist.

The following describes an embodiment of the present invention based on the FIG. 1 to FIG. 3, which details an intelligent and efficient fire extinguishing method based on the internal and external flow field information of the storage tank on fire.

S1: when a storage tank fire occurs, the intelligent control system 300 is used to monitor and identify the operating status of the storage tank, confirm the position of the burning storage tank, and control the intelligent and efficient fire extinguishing device to move towards the burning storage tank.

S2: after the intelligent and efficient fire extinguishing device moves near the burning storage tank, the wind direction and flow field measuring device 110 determine the upwind side position of the burning storage tank.

S3: the intelligent control system 300 controls the intelligent and efficient fire extinguishing device to move to the upwind side and controls the fixation system 500 to attach to the sidewall of the storage tank.

S4: the intelligent control system 300 controls the protection system 700 to perform cooling and spraying operations. Simultaneously, the intelligent control system 300 controls the water pump 720 to perform water pumping operations.

S5: the intelligent control system 300 controls the support lifting system 500 to lift the fire-fighting water cannon 430 to the top of the storage tank.

S6: the intelligent control system 300 controls the automatic telescopic pipeline 431 to extend the pressure and flow field measuring device 120 and the foam nozzle 433 into the storage tank.

S7: the steering gear 432 is controlled to rotate to adjust the monitoring angle of the pressure and flow field measuring device 120. By adjusting the measurement direction of the pressure and flow field measuring device 120, the "air intake channels" position of the burning storage tank is determined, facilitating the rapid entry of the sprayed foam into the storage tank under the action of air entrainment.

S8: the intelligent control system 300 controls the fire-fighting water cannon 430 to spray foam.

What is claimed is:

1. An intelligent and efficient fire extinguishing device based on internal and external flow field information of a storage tank on fire, comprising an intelligent sensing system, a power-driven system, an intelligent control system, a foam system, a fixation system, a support lifting system and a protection system;

the intelligent sensing system is used to obtain the flow field information inside and outside of the storage tank on fire and then determine a position of an upwind side of the storage tank as well as a position of "air intake channels" inside the storage tank, so as to realize planning of a moving route of the intelligent and efficient fire extinguishing device and determination of a spraying angle of the foam system; the intelligent sensing system comprises a wind direction and flow field measuring device, a pressure and flow field measuring device;

the power-driven system is used to provide power and move the intelligent and efficient fire extinguishing device; the power-driven system comprises a power chassis and a power supply;

the intelligent control system is used to receive and identify the operating status of the storage tank and intelligently control the operation of each system of the intelligent and efficient fire extinguishing device;

the foam system is used to spray foam to the storage tank; the foam system comprises a foam supply tank, a foam supply line and a fire-fighting water cannon; the fire-fighting water cannon comprises an automatic telescopic pipeline, a steering gear and a foam nozzle;

the fixation system is used to fix the intelligent and efficient fire extinguishing device to a sidewall of the storage tank;

the protection system is used to protect and cool down the intelligent and efficient fire extinguishing device to ensure the intelligent and efficient fire extinguishing device operates normally in a high temperature environment; the protection system comprises a water tank, a water pump, a telescopic water supply pipeline, a cooling nozzle and a water circulation device;

the support lifting system is used to lift or rotate the cooling nozzle and the fire-fighting water cannon; the support lifting system comprises a lifting platform, a rotating device and an automatic lifting strut.

2. The intelligent and efficient fire extinguishing device based on the internal and external flow field information of the storage tank on fire as claimed in claim 1, wherein the wind direction and flow field measuring device is arranged on the automatic telescopic pipeline, which is used to collect the flow field and wind direction information outside the storage tank and then confirm the position of the upwind side of the storage tank; the pressure and flow field measuring device is arranged on the foam nozzle to measure the flow field distribution inside the storage tank and to confirm the position of the "air intake channels".

3. The intelligent and efficient fire extinguishing device based on the internal and external flow field information of the storage tank on fire as claimed in claim 1, wherein the power chassis is used to move or swerve the intelligent and efficient fire extinguishing device; the power supply is used to provide power to the intelligent and efficient fire extinguishing device.

4. The intelligent and efficient fire extinguishing device based on the internal and external flow field information of the storage tank on fire as claimed in claim 1, wherein the foam supply tank is used to store and supply foam; the foam supply tank comprises a foam supply flange port; the foam supply flange port is used to input foam into the foam supply tank from exterior; two sides of the foam supply line are connected to the foam supply tank and the fire-fighting water cannon; the fire-fighting water cannon is used to spray foam into an interior of the storage tank; the automatic telescopic pipeline is arranged on the lifting platform to probe out or retract the steering gear, the foam nozzle and the pressure and flow field measuring device; the steering gear is set at a top of the automatic telescopic pipeline and connected to the foam nozzle; the steering gear is used to adjust the spraying direction of the foam nozzle and a monitoring angle of the pressure and flow field measuring device; the foam nozzle is used to disperse and spray foam.

5. The intelligent and efficient fire extinguishing device based on the internal and external flow field information of the storage tank on fire as claimed in claim 1, wherein the fixation system comprises a telescopic rod and an electromagnet adsorption device: the telescopic rod is located on the side of the power chassis to adjust the position of the electromagnet adsorption device; the electromagnet adsorption device is located on a top of the telescopic rod for adsorption on a sidewall of the storage tank, so that the power chassis is fixed on the storage tank.

6. The intelligent and efficient fire extinguishing device based on the internal and external flow field information of the storage tank on fire as claimed in claim 1, wherein the lifting platform is fixed on a top of the automatic lifting strut, which is used to place and fix the fire-fighting water cannon, the intelligent sensing system and the cooling nozzle; the rotating device is used to drive a rotation of the lifting platform, which in turn adjusts the spray direction of the fire-fighting water cannon; the automatic lifting strut is used to lift and lower the lifting platform, which in turn drives the lifting and lowering of the fire-fighting water cannon, the cooling nozzle and the intelligent sensing system.

7. The intelligent and efficient fire extinguishing device based on the internal and external flow field information of the storage tank on fire as claimed in claim 1, the water tank is placed on the power chassis for storage and supply water; the water tank comprises a water supply flange port and a water supply line; the water supply flange is used to supply water to the water tank from exterior; two ends of the water supply line are connected to the water tank and the telescopic water supply pipeline; the water pump is connected at both ends to the telescopic water supply pipeline and the water circulation device to pump water from the water circulation device to the cooling nozzle; the cooling nozzle is fixed on the lifting platform to spray cooling water mist; the water circulation device is used to collect the water sprayed by the cooling nozzle.

8. The intelligent and efficient fire extinguishing device based on the internal and external flow field information of the storage tank on fire as claimed in claim 1, wherein the intelligent control system is located on the power chassis; the intelligent control system is used to monitor and identify the operational status of the storage tanks; the intelligent control system is also used to acquire and analyze information from the intelligent sensing system and thereby plan the route of the power chassis and the direction of the fire-fighting water cannon; the intelligent control system is also used to control the travelling or steering of the power chassis, which in turn drives the movement of the intelligent and efficient fire extinguishing device; the intelligent control system is further used to control the supply of the foam to the fire-fighting water cannon from the foam supply tank; the intelligent control systems is also used to control the expansion, shortening, steering and foam spraying of the fire-fighting water cannon; the intelligent control system is also used to control the expansion and shortening of the telescopic rod and is used to control the electromagnet adsorption device to adsorb the sidewall of the storage tank; the intelligent control system is also used to control the lifting and/or rotation of the support lifting system; the intelligent control system is also used to control the switching on and off of the water pump in the protection system.

9. A method of using the intelligent and efficient fire extinguishing device based on internal and external flow field information of a storage tank on fire according to any one of claims 1 to 8, comprising the steps of:

S1: when the storage tank on fire occurs, the intelligent control system is used to monitor and identify an operating status of the tank, confirm a location of the storage tank on fire, and control the intelligent and efficient fire extinguishing device to move towards the storage tank on fire;

S2: after the intelligent high-efficiency fire extinguishing device moves to a vicinity of the storage tank on fire, the wind direction and flow field measuring device determines an upwind position of the storage tank;

S3: the intelligent control system controls the intelligent and efficient fire extinguishing device to move to the upwind side and controls the fixation system to be adsorbed and fixed to a sidewall of the storage tank;

S4: the intelligent control system controls the protection system for spray cooling operations;

S5: the intelligent control system controls the support lifting system to lift the fire-fighting water cannon to a top position of the storage tank;

S6: the intelligent control system controls the automatic telescopic pipeline that extends the pressure and flow field measuring device and the foam nozzle into the interior of the storage tank;

S7: the intelligent control system controls a rotation of the steering gear to adjust the monitoring angle of the pressure and flow field measuring device;

S8: the intelligent control system controls the fire-fighting water cannon to spray foam.

* * * * *